(12) United States Patent
Gray

(10) Patent No.: US 8,871,021 B2
(45) Date of Patent: Oct. 28, 2014

(54) CONCRETE MIXTURES INCLUDING CARBON ENCAPSULATING ADMIXTURE

(75) Inventor: Lonnie James Gray, Murray, UT (US)

(73) Assignee: Staker & Parson Companies, West Haven, UT (US)

( * ) Notice: Subject to any disclaimer, the term of this patent is extended or adjusted under 35 U.S.C. 154(b) by 117 days.

(21) Appl. No.: 13/415,824

(22) Filed: Mar. 8, 2012

(65) Prior Publication Data

US 2012/0227630 A1 Sep. 13, 2012

Related U.S. Application Data

(60) Provisional application No. 61/450,614, filed on Mar. 8, 2011.

(51) Int. Cl.
*C04B 24/12* (2006.01)
*C04B 103/40* (2006.01)
*C04B 38/08* (2006.01)

(52) U.S. Cl.
CPC .................................... *C04B 38/08* (2013.01)
USPC ........................... 106/727; 106/724; 106/823

(58) Field of Classification Search
USPC ......................................... 106/724, 823, 727
See application file for complete search history.

(56) References Cited

U.S. PATENT DOCUMENTS

| 4,257,815 | A  | * | 3/1981  | Hauser ............................ | 106/679 |
| 6,068,131 | A  | * | 5/2000  | Styron et al. ................... | 209/166 |
| 6,599,358 | B1 | * | 7/2003  | Boggs ............................ | 106/705 |
| 6,706,111 | B1 | * | 3/2004  | Young ............................ | 106/705 |
| 7,312,184 | B2 | * | 12/2007 | Boudreau ....................... | 507/267 |
| 7,485,184 | B2 | * | 2/2009  | Hill et al. ...................... | 106/705 |
| 7,754,705 | B2 |   | 7/2010  | Savage et al.                  |         |
| 7,892,349 | B2 | * | 2/2011  | Hill et al. ...................... | 106/705 |
| 7,892,350 | B2 | * | 2/2011  | Hill et al. ...................... | 106/705 |
| 7,901,505 | B2 | * | 3/2011  | Hill et al. ...................... | 106/705 |
| 7,976,625 | B2 | * | 7/2011  | Mao et al. ...................... | 106/705 |
| 8,454,745 | B2 | * | 6/2013  | Nakamura et al. ............. | 106/705 |
| 2003/0034479 | A1 | | 2/2003 | Marazzani et al.           |         |
| 2004/0129180 | A1 | * | 7/2004 | Boggs ........................... | 106/705 |
| 2010/0139523 | A1 | | 6/2010 | Gray                           |         |

FOREIGN PATENT DOCUMENTS

| JP | 2000-313648 | 11/2000 |
| WO | 95-24415    | 9/1995  |
| WO | 02/088241   | 11/2002 |
| WO | 2003-015757 | 2/2003  |
| WO | 2007-089903 | 8/2007  |
| WO | 2007-089906 | 8/2007  |
| WO | 2011-109704 | 9/2011  |

OTHER PUBLICATIONS

Michael D Howell et al: "Ceragenins. A 1-18, Class of Antiviral Compounds to Treat Orthopox Infections", Journal of Investigative Dermatology, vol. 129, No. 11, Jun. 11, 2009, pp. 2668-2675.
K. Leszczynska et al: "Potential of ceragenin CSA-13 and its mixture with pluronic F-127 as treatment of topical bacterial infections", Journal of Applied Microbiology, vol. 110, No. 1, Oct. 21, 2010, pp. 229-238.
Isogai E et al: "Ceragenin CSA-13 exhibits antimicrobial activity against cariogenic and periodontopathic bacteria", Oral Microbiology and Immunology, vol. 24, No. 2, Apr. 2009, pp. 170-172.
Van Bambeke et al: "The bacterial envelope as a target for novel anti-MRSA antibiotics", Trends in Pharmacological Sciences, Elsevier, Haywarth, GB, vol. 29, No. 3, Feb. 11, 2008, pp. 124-134.
Qunying Guan et al: "Preparation and Characterization of Cholic Acid-Derived Antimicrobial Agents with Controlled Stabilities", Organic Letters, American Chemical Society, US, vol. 2, No. 18, Sep. 7, 2000, pp. 2837-2840.
Alhanout K et al: "Squalamine as an example of a new potent antimicrobial agents class: a critical review.", Current Medicinal Chemistry 2010, vol. 17, No. 32, 2010, pp. 3909-3917.

* cited by examiner

*Primary Examiner* — Paul Marcantoni
(74) *Attorney, Agent, or Firm* — Workman Nydegger

(57) ABSTRACT

Concrete mixtures for use with air entraining agents and supplementary cementitious materials are achieved using a carbon encapsulating agent. The carbon encapsulating agent can include a nitrilotrisethanol aliphatic soap.

21 Claims, No Drawings

CONCRETE MIXTURES INCLUDING CARBON ENCAPSULATING ADMIXTURE

CROSS-REFERENCE TO RELATED APPLICATIONS

This application claims the benefit of U.S. Provisional application 61/450,614 filed Mar. 8, 2011, titled "CONCRETE MIXTURES INCLUDING CARBON ENCAPSULATING ADMIXTURE", which is incorporated herein by reference in its entirety.

BACKGROUND OF THE INVENTION

1. The Field of the Invention

The present invention relates to flowable concrete mixtures and cured concrete obtained therefrom. More particularly, the present invention relates to concrete mixtures that have an aqueous based carbon encapsulating admixture.

2. Related Technology

Concrete mixtures are composite materials that are usually composed of water, cement, and aggregate. Common aggregates include sand, gravel, or crushed stone. Concrete is a well-known structural component with typical compressive strengths of about 2500 psi, when cured.

Admixtures are often added to concrete to give the concrete desired properties. Examples of suitable uses for concrete admixtures include lowering the concrete's density, improving the concrete's workability, improving the concrete's strength to weight ratio, giving the concrete insulating properties, and/or enhancing the acoustic properties of the concrete, among others. These beneficial properties are often accomplished by adding several different admixtures.

Air entraining agents are often used alone or in combination with other admixtures to give the concrete one or more of the foregoing properties. Air entraining admixtures are used to purposely trap microscopic air bubbles in the concrete. Air entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding.

There are several methods for entraining air in concrete. One approach is to generate bubbles or air pockets in situ. This approach can be accomplished using surfactants or other air entraining admixtures that generate bubbles as the concrete is mixed. Materials used to achieve these desired effects include non-ionic, cationic, and anionic surfactants, natural and synthetic resins, fatty acids, proteinaceous material, sulfonated hydrocarbons, and the like.

Another trend in concrete is to incorporate supplementary cementitious materials such as fly ash and pozzolans. However, many SCMs are known to reduce air entrainment and/or cause great variability in air entrainment, thereby making it difficult to achieve consistent results in the performance of the concrete (both wet and cured).

The desire to use SCMs such as fly ash in concrete is quite compelling due to cost reduction. There has been extensive research over a long period of time to mitigate the detrimental effects that fly ash and other SCMs can have on air entrainment. Despite this long felt need, there still does not exist a simple and economical solution to solve the variability in air entrainment when using fly ash.

DESCRIPTION OF THE INVENTION

I. Concrete Mixtures

The composition of the concrete mixtures of the present invention can vary depending on the desired use for the concrete. In general, the concrete mixtures of the present invention include at least (i) a hydraulic cement, (ii) water, (iii) an SCM that includes carbon, (iv) an air entraining agent, and (v) a carbon encapsulating agent. The concrete mixtures typically include one or more aggregates, which gives the concrete strength. Dispersants and other admixtures are also described below and can be included to give the concrete mixtures of the present invention desired properties.

The carbon encapsulating agent is a surfactant that includes hydrophilic and lipophilic groups. In one embodiment the encapsulating agent is insoluble in the mixture of water and air-entraining agent. The encapsulating agent coats the carbon particles rather than the micro-air bubbles. This allows the concentration of the encapsulating agent to be selected independent of the air entraining agent. Thus, the concentration of the carbon encapsulating agent can be selected according to the concentration of SCM in the concrete mixture (and thus the amount of deleterious carbon), while the concentration of the air entraining agent is selected to produce the desired concentration of air.

The mixtures and methods of the present invention provided important control over the manufacture of concretes with SCMs that include carbon. Because the encapsulating agent and air entraining agent work separately, the cost of each can be minimized. Experimental data shows that small amounts of encapsulating agent can have drastic affects on the amount of air entraining agent needed to reach the desired level of air entrainment. In addition, the use of lower amounts of air entraining agent allows water to be added without causing large changes in the air entrainment, which can be very detrimental to strength and finishability of the concrete.

A. Hydraulic Cement and Water

The cement included in the concrete mixtures of the present invention is a hydraulic material such as Portland cement, modified Portland cement, or masonry cement. For purposes of this invention, Portland cement includes all cementitious compositions which have a high content of tricalcium silicate, including Portland cement, cements that are chemically similar or analogous to Portland cement, and cements that fall within ASTM specification C-150-00. Other cementitious materials include ground granulated blast-furnace slag, hydraulic hydrated lime, white cement, slag cement, calcium aluminate cement, silicate cement, phosphate cement, high-alumina cement, magnesium oxychloride cement, and combinations of these and other similar materials.

Water is added to the concrete mixture in sufficient amounts to hydrate the cement. Those skilled in the art will recognize that the amount of water needed will depend on the desired flowability and on the amounts and types of admixtures included in the concrete composition. Many of these admixtures are discussed below. In general, suitable amounts of water for hydrating the cement ranges from about 1% to about 50%, more preferably about 5-50%, and most preferably about 10% to about 25% of the concrete mixture by weight.

B. Supplementary Cementing Material

The supplementary cementitious material (SCM) can be a natural or synthetic pozzolan that can react with excess calcium from a hydraulic cement to form a cementitious material. In a preferred embodiment, the SCM may include, but is not limited to, fly ash such as coal ash. ASTM C618 standard, which is incorporated herein by reference, recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal. The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. The use of Class C fly ash can be particularly useful to replace a portion of the cement in the concrete. Class C fly ash and Portland cement can be blended in weight ratios of ash to cement of about 0/100 to 150/100, preferably 75/100 to 125/100. In some reactive powder blends the portland cement is about 40 to 80 wt % and fly ash 20 to 60 wt %.

Because fly ash is obtained from coal combustion or found naturally, fly ash typically includes a certain amount of carbon. The amount of carbon in fly ash is measured according loss on ignition (LOI). Fly ash that has an LOI greater than about 1.5 can be difficult to work with in concrete mixtures that have air entraining agents because the carbon destroys the air entrainment. The inventor of the present invention has found that the carbon encapsulating agents described herein are surprisingly effective at sequestering the carbon in fly ash.

Thus, in one embodiment of the invention, the concrete mixture includes a fly ash having an LOI greater than or equal to 1.0, 1.5, 2, 4, or 6 as measured using ASTM standard procedures and less than 20, 15, or 10 or within a range of the foregoing. It has also been found that high carbon fly ash when used in combination with the carbon encapsulating agents of the present invention, increases the strength of the cured concrete as compared to fly ash that is not high carbon (i.e., the carbon in combination with the carbon encapsulating agent can be beneficial).

C. Carbon Encapsulating Agents

The carbon encapsulating agent is a composition including one or more non-foaming surfactants that can sequester carbon and thereby isolate the carbon from the air entraining agent. In one embodiment, the encapsulating agent may form a micelle around carbon particles. In some embodiments the micelle may be a spherical micelle. The encapsulation or formation of a micelle is achieved by selecting a surfactant that can form micelles with a hydrophobic interior that are sufficiently large to encapsulate the carbon particles. Forming micelles with a hydrophobic interior that is sufficiently large to encapsulate carbon can be achieved using surfactant molecules with water-insoluble aliphatic groups such as long chain aliphatic acids and/or alcohols.

In a preferred embodiment, the carbon encapsulating agent is a non-foaming surfactant. The use of a non-foaming surfactant inhibits the miscibility of the carbon encapsulating agent and the air entraining agent, which allows them to function separately within the same mixture.

In addition, it may be desirable for the encapsulating agent to have a hydrophobicity in which the carbon encapsulating agent has a greater affinity for the carbon particles than a mixture of water and air entraining agent. In one embodiment, the encapsulating agent may be insoluble or have less than 5% or 1% solubility in a mixture of the water and air entraining agent at a pH and temperature suitable for the hydrating cement.

The encapsulating agent can include one or more active agents and/or solvents to allow the agent to be dispersed in the concrete during mixing.

In a preferred embodiment the carbon encapsulating agent has a molecular weight of at least 200, 300, 400, 500, 750, or 1000 Da and/or less than 20,000, 10,000, or 5,000 Da or a range thereof. In one embodiment, the agent includes a hydrocarbon moiety of at least 200, 300, 400, or 500 Da. In one embodiment the encapsulating agent forms micelles in cement paste that have a molecular weight greater than 10,000, 25,000, or 50,000 Da.

The encapsulating agent may be an amphipathic molecule or surfactant that includes a plurality of aliphatic groups. The aliphatic groups may be formed from water insoluble aliphatic alcohols or acids.

The encapsulating agent can include one or more of the following components: (i) one or more solvents, (ii) nitrilotrisethanol aliphatic soap; (iii) alkyl ether amine reacted with one or more aliphatic acids; (iiv) and/or an aliphatic alcohol. Preferably the carbon encapsulating agent includes at least nitrilotrisethanol aliphatic soap and most preferably a 2,2,2-nitrilotrisethanol aliphatic acid soap. The nitrilotrisethanol can be included in the encapsulating agent at a weight percent of 0.25-18 wt %, 0.5-9 wt %, or 0.1-4.5 wt %.

The concentration of the alkyl ether amine reacted with one or more aliphatic acids may be in a range from 10%-70%, more preferably 25%-55% by weight of the encapsulating agent.

The encapsulating agent can include an aliphatic alcohol having a branched straight chain, substitute or unsubstituted carbon chain of 6, 8, 10, 12, 14, or 16 carbons and/or less than 32, 24, 20, 18, or 16 carbons or a combination thereof. In one embodiment, the aliphatic alcohol is non-soluble. Non-soluble alcohols can produce reaction products that readily form micelles that can encapsulate carbon (i.e., create a micelle around the carbon).

The linear aliphatic alcohol may have a concentration in a range from 1%-20% by weight of the carbon encapsulating agent, preferably 3-10%.

In an example of a suitable carbon encapsulating agent having the foregoing properties is F-500 encapsulating agent, Pinnacle firefighting foam, HydroLock, and C-Sync products, which are manufactured by Hazard Control Technologies, Inc of Fayetteville, Ga., USA. Additional details about suitable encapsulating agents that can be used are disclosed in U.S. Pat. No. 5,945,026, which is incorporated herein by reference.

F-500 encapsulating agent is a well-known and widely distributed non-foaming firefighting agent. The ability of F-500 to provide consistency in air entrainment across a wide range of carbon content and/or concentrations of SCMs while allowing independent control of the air entrainment using an air entraining agent is a surprising and unexpected result.

The carbon encapsulating agents can be included in the concrete mixture in a concentration of from 0.5-100 oz of encapsulating agent per 100 lbs of cement or binder, alternatively 0.5-30 oz/100 wt cement or binder, or 1.0-10 oz/100 wt cement or binder. Typically the amount of encapsulating agent is selected according to the amount of SCM used. In one embodiment the encapsulating agent is included in a concrete mix at a concentration of 0.5, 0.75, 1.0, 1.25, or 1.5 oz per 100 wt of SCM, and less than 30, 15, 10, 7.5, or 5.0 oz per 100 wt of SCM, where the SCM has a LOI as described above. In one embodiment, the carbon encapsulating agent is selected so as to be in sufficient quantity to encapsulate a majority of the carbon provided by an SCM. A sufficient quantity can be determined by testing air entrainment and adding encapsulating agent until the difference in the amount of air entraining agent to achieve the same level of air entrainment as compared to a mix with no SCM is less than half the extra amount of entraining agent needed to achieve the same level of air entrainment when using the SCM. The air entrainment can be included sufficient to encapsulate at least 75%, 90%, 95%, or even 99% or more of the carbon included in the mix with the SCM.

D. Air Entraining Agents

The concrete mixtures of the invention may also include an air entraining agent. Air-entraining agents are compounds that entrain microscopic air bubbles in cementitious compositions, which then harden into concrete having microscopic air voids. Entrained air dramatically improves the durability of concrete exposed to moisture during freeze thaw cycles and greatly improves a concrete's resistance to surface scaling caused by chemical deicers. Air-entraining agents can also reduce the surface tension of a fresh cementitious composition at low concentration. Air entrainment can also increase the workability of fresh concrete and reduce segregation and bleeding. Examples of suitable air-entraining agents include wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, inorganic air entrainers, synthetic detergents, the corresponding salts of these compounds, and mixtures of these compounds. Air entrainers are added in an amount to yield a desired level of air in a cementitious composition. Generally, the amount of air entraining agent in a cementitious composition ranges from about 0.2 to about 30 fluid ounces per hundred pounds of dry cement or binder, alternatively 0.5-15, or 1.0-10. Weight percentages of the primary active ingredient of the air-entraining agents (i.e., the compound that provides the air entrainment) are about 0.001% to about 0.3%, based on the weight of dry cementitious material. The particular amount used will depend on materials, mix proportion, temperature, and mixing action.

Air entraining agents that may also be used include foams formed ex-situ, including stabilized foams such as, but not limited to foams described in Applicants co-pending U.S. patent application Ser. No. 12/701,398, filed Feb. 5, 2010, which is incorporated herein by reference in its entirety.

D. Aggregates

Aggregates are usually included in the concrete mixture to add bulk and to give the concrete strength. The aggregate can be a fine aggregate and/or a coarse aggregate. The fine aggregates are materials that pass through a Number 4 sieve (ASTM C125 and ASTM C33), such as silica sand. The coarse aggregate are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof. Whether an aggregate needs to be added can depend on the desired use of the cured concrete. Aggregate sizing and selection for particular types of concrete (e.g., flowable fill and self consolidating concrete) is known in the art. The concrete mixtures of the present invention can include traditional aggregates such as coarse and fine aggregates.

E. Dispersants and/or Water-Reducers

Water reducers are used in concrete mixtures to lower the water content in the plastic concrete (i.e. uncured concrete) to increase its strength and to obtain higher slump without adding water. Water-reducers will generally reduce the required water content of a concrete mixture for a given slump and are useful for pumping concrete and in hot weather to offset the increased water demand. These admixtures disperse the cement particles in the concrete and make more efficient use of the hydraulic cement. This dispersion increases strength and/or allows the cement content to be reduced while maintaining the same strength. Water-reducers should meet the requirements for Type A in ASTM C 494 Specification.

Another class of water reducers includes mid-range water reducers. These water reducers have a greater ability to reduce the water content of the concrete and are often used because of their ability to improve the finishability of concrete flatwork. Mid-range water reducers should at least meet the requirements for Type A in ASTM C 494.

High range water-reducers (HRWR), also referred to as superplasticizers, are a special class of water-reducer. HRWRs reduce the water content of a given concrete mixture by about 12% to 30%. HRWRs are used to increase strength and reduce permeability of concrete by reducing the water content in the mixture or greatly increase the slump to produce "flowing" concrete without adding water. HRWRs are often used for high strength and high performance concrete mixture that contain higher contents of cementitious materials and mixtures containing silica fume. In a typical concrete mixture, adding a normal dosage of HRWRs to a concrete mixture with a slump of 3 to 4 inches (75 to 100 mm) will produce a concrete with a slump of about 8 inches (200 mm). Exemplary HRWRs that can be used in the present invention are covered by ASTM Specification C 494 and types F and G, and Types 1 and 2 in ASTM C 1017. Particularly advantageous dispersants include the HRWRS described in U.S. Pat. No. 6,858,074, which is incorporated herein by reference.

F. Viscosity Modifiers

Viscosity modifying agents (VMA), also known as rheological modifiers or rheology modifying agents, can be added to the concrete mixture of the present invention. These additives are usually water-soluble polymers and function by increasing the apparent viscosity of the mix water. This enhanced viscosity facilitates uniform flow of the particles and reduces bleed, or free water formation, on the fresh paste surface.

Suitable viscosity modifiers that can be used in the present invention include, for example, cellulose ethers (e.g., hydroxyethyl cellulose (HEC), hydroxyproplmethyl cellulose (HPMC), sodium carboxymethyl cellulose (CMC), carboxymethylhydroxyethyl cellulose (CMHEC), and the like); synthetic polymers (e.g., polyacrylates, polyvinyl alcohol (PVA), polyethylene glycol (PEG), and the like); exopolysaccharides (also known as biopolymers, e.g., welan gum, xanthan, rhamsan, gellan, dextran, pullulan, curdlan, and the like); marine gums (e.g., algin, agar, carrageenan, and the like); plant exudates (e.g., locust bean, gum arabic, gum Karaya, tragacanth, Ghatti, and the like); seed gums (e.g., Guar, locust bean, okra, psyllium, mesquite, and the like); starch-based gums (e.g., ethers, esters, and related derivatized compounds). See, for example, Shandra, Satish and Ohama, Yoshihiko, "Polymers In Concrete", published by CRC press, Boca Ration, Ann Harbor, London, Tokyo (1994).

Viscosity modifying agents are typically used with water reducers in highly flowable mixtures to hold the mixture together. Viscosity modifiers can disperse and/or suspend components of the concrete thereby assisting in holding the concrete mixture together. This property of viscosity modifiers makes them useful for making self compacting concrete, which requires high flowability.

G. Other Admixtures

Many other types of admixtures can be added to the concrete compositions of the present invention to give the concrete a desired property. As discussed below, other admixtures suitable for use in the concrete mixtures of the present invention include but are not limited to viscosity modifiers, corrosion inhibitors, pigments, wetting agents, water soluble polymers, strength enhancing agents, rheology modifying agents, water repellents, fibers, permeability reducers, pumping aids, fungicidal admixtures, germicidal admixtures, insecticidal admixtures, finely divided mineral admixtures, alkali reactivity reducer, bonding admixtures, and any other admixtures or additive that do not adversely affect the carbon encapsulating compounds.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Permeability reducers are used to reduce the rate at which water under pressure is transmitted through concrete. Silica fume, fly ash, ground slag, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fibers can be distributed throughout a fresh concrete mixture to strengthen it. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present invention can include but is not limited to alkali metal sulfate, alkaline earth metal sulfates, alkaline earth oxides, preferably sodium sulfate and calcium oxide.

Alkali-reactivity reducers can reduce the alkali-aggregate reaction and limit the disruptive expansion forces in hardened concrete. Pozzolans (fly ash and silica fume), blast-furnace slag, salts of lithium, and barium are especially effective.

Bonding admixtures are usually added to hydraulic cement mixtures to increase the bond strength between old and new concrete and include organic materials such as rubber, polyvinyl chloride, polyvinyl acetate, acrylics, styrene butadiene copolymers, and other powdered polymers.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

III. Methods for Making and using Concrete Mixtures

The concrete mixtures are prepared by selecting appropriates amounts of hydraulic cement, water, aggregate, air entraining agent, an SCM that includes at least 0.5%, 1%, 1.5%, 4%, 6%, or 8% carbon, and carbon encapsulating agent to sequester at least 60%, 80%, 90%, 95%, or 99% of the carbon in SCM. The encapsulating agent sequesters the carbon without itself entraining air. Thus, the air entrainment is controlled by the dosing of the air entraining agent and the dosing can be more silimar to traditional concentrations of air entrainment. This is in contrast to the technique used in prior art methods where the carbon is saturated using the air engraining agent. In the methods of the prior art, the air entraining agent is still interacting with the carbon, but an excess of air entraining agent creates the air. Obtaining proper dosing can be very difficult since proper dosing requires proper estimation of the carbon in the SCM, which can be highly variable. In contrast, by encapsulating the carbon, a majority to substantially all of the carbon can be sequestered and the variability in the air entrainment caused by the carbon can be significantly reduced or eliminated.

The amount of cement, water, aggregate, and SCM will typically be selected according to the design strength of the concrete and the materials available. The design strength of the concrete will depend on the particular application. The compositions of the invention can include wall mixes, sidewalk mixes, foundation mixes, flowable fill mixes, self consolidating concrete mixes, and the like. In one embodiment the design strength of the concrete is at least 500 psi, 1000 psi, 2000 psi, 3000 psi, 4000 psi, 5000 psi, 7000 psi, or 10,000 psi (or an approximation of the metric equivalent thereof). The concrete can have a design strength according to a range created from any of the foregoing strengths as endpoints. In some embodiments, the design strength can be less than 3000, 2000, or even 1000. This is advantageous for making flowable fill or excavateable concrete, which tends to have a very high air content.

Although not required, the present invention can be particularly useful for flowable fill concretes or self consolidating concrete where high flow and/or high air content is important. In one embodiment, the composition has an air content of at least 2%, 2.5%, 5%, 7.5%, or 10%.

The SCM content can be in a range from 0%-75% by weight of the binder content (i.e., as a percentage of the hydraulic cement and SCM fraction). In a preferred embodiment, the SCM is at least 5%, 10%, 15%, 20%, 25%, 30%, or 35% and less than 60%, 50%, 40%, or 35%, or a range between these endpoints. Higher SCM content can be advantageous for cost and performance reasons. The use of the carbon encapsulating material allows for the use of higher quantities of SCM while achieving the same or better air entrainment as compared to concrete composition that include a Portland cement and air entraining agent without the carbon encapsulating agent.

The carbon encapsulating agent is included in a concentration that allows the desired air entrainment (i.e., by sequestering the carbon in the SCM) while minimizing the amount of agent that is used. The carbon encapsulating agent is typically added as a concentrate of 25%-80% (preferably 40-50%) active agent of the concentrate. The concentrate can be added in amounts of 0.25-100 oz per hundred weight cement, 0.5-30, or 1-10 oz/100 wt cement or binder. Those skilled in the art will recognize that the optimal dosage will depend on the materials being used, the carbon content of the fly ash, the amount of fly ash used, and the desired air entrainment. Those skilled in the art are familiar with dosing admixtures to determine a desired amount for a particular application.

The air entrained by the air entraining agent in the presence of the carbon encapsulating agent can have a surface area that meets or exceeds ASTM standards available in March of 2011.

The compositions can be prepared using equipment known in the art. For example, in one embodiment, the compositions of the invention may be prepared at a ready mix plant and distributed in a local area.

IV. Examples

Example 1 illustrates a flowable fill concrete compositions according to the present invention. In each formula, admixtures (e.g. water reducers WR) were added based on 100 lbs of cement (i.e. 100-wt cement). The concrete mixture of Examples 1 achieved 12% air.

Example 1

| COMPONENTS | AMOUNTS |
|---|---|
| Portland Cement | 80 lbs/yd$^3$ |
| Class F Fly Ash (LOI 4.0) | 150 lbs/yd$^3$ |
| Water | 42 gal/yd$^3$ |
| Aggregate | 2929 lbs/yd$^3$ |
| MICRO-AE (Air Entraining Agent) | 10 oz/100-wt |
| F-500 (Hazard Control Technologies) | 4.9 oz/100-wt |

Examples 2-19 illustrates the performance of concrete mixtures including a carbon encapsulating agent, an air entraining agent, and fly ash, aggregate, Portland cement and water. The SCM was a class F fly ash included in an amount of 20% of the cementitious material (by weight). In Examples 2, 4, 6, 8, 10, 12, 14, 16, and 18, no encapsulating agent was added. In Examples 3, 5, 7, 9, 11, 13, 15, 17, and 19, the mixes included 2 oz of encapsulating agent (F-500) per 100 wt of fly ash. The amount of air entraining agent (Micro Air) was used in a sufficient concentration to achieve at least 6% air entrainment (AE).

Examples 2-19

| Examples | 2 | 3 | 4 | 5 | 6 | 7 | 8 | 9 | 10 | 11 |
|---|---|---|---|---|---|---|---|---|---|---|
| F-500 agent | 0 | 2 | 0 | 2 | 0 | 2 | 0 | 2 | 0 | 2 |
| Water | 32 | 39.1 | 32 | 39.7 | 32.75 | 40.1 | 34 | 39.7 | 34 | 40.5 |
| Micro Air | 15.1 | 1.4 | 16 | 1.3 | 22 | 0.8 | 23 | 0.5 | 23 | 0.5 |
| W/C Ratio | 0.46 | 0.56 | 0.46 | 0.57 | 0.47 | 0.58 | 0.49 | 0.57 | 0.49 | 0.58 |
| Slump | 3 | 4.25 | 3.25 | 5.25 | 3 | 4.5 | 3.25 | 4.25 | 3 | 4.5 |
| Test AE % | 6.2 | 7.2 | 6.5 | 9.4 | 6.5 | 7.7 | 6.5 | 6.2 | 6.5 | 6.4 |
| 3 day | 2792 | 2506 | 2664 | 1984 | 2695 | 2410 | 2422 | 2703 | 2869 | 2381 |
| 7 day | 3381 | 3789 | 3665 | 2861 | 3448 | 3280 | 3022 | 3688 | 3797 | 3644 |
| 14 day | 4526 | 4990 | 4367 | 3788 | 4069 | 4642 | 3777 | 4942 | 4612 | 5002 |
| 28 day average | 5461 | 6663 | 5272 | 4947 | 5210 | 5663 | 4906 | 6501 | 5816 | 6631 |
| 56 day | 6343 | 6641 | 5987 | 5369 | 6293 | 617 | 6023 | 6562 | 6781 | 6643 |
| PSI Per LB-28 | 9.42 | 11.49 | 9.09 | 8.53 | 8.98 | 9.76 | 8.46 | 11.21 | 10.03 | 11.43 |
| PSI Per LB-56 | 10.94 | 11.45 | 10.32 | 9.257 | 10.85 | 1.064 | 10.38 | 11.31 | 11.69 | 11.45 |

| Examples | 12 | 13 | 14 | 15 | 16 | 17 | 18 | 19 |
|---|---|---|---|---|---|---|---|---|
| F-500 Agent | 0 | 2 | 0 | 2 | 0 | 2 | 0 | 2 |
| Water | 34 | 39.8 | 34 | 40.4 | 31 | 34.2 | 31 | 34.9 |
| Micro Air | 24 | 0.5 | 22.1 | 0.5 | 3.5 | 4 | 4.25 | 4 |
| W/C Ratio | 0.49 | 0.57 | 0.49 | 0.58 | 0.45 | 0.49 | 0.45 | 0.50 |
| Slump | 3 | 4.25 | 3.5 | 4.25 | 3.5 | 4 | 4.25 | 4.25 |
| Test AE % | 7.5 | 6.2 | 8.0 | 6.1 | 6.5 | 5.9 | 6.9 | 7.6 |
| 3 day | 2153 | 2651 | 2192 | 2742 | 2785 | 3026 | 3246 | 3038 |
| 7 day | 2933 | 3835 | 3053 | 4273 | 3451 | 4253 | 4371 | 4306 |
| 14 day | 3514 | 5174 | 3723 | 5657 | 4609 | 4831 | 5286 | 5321 |
| 28 day average | 4352 | 6447 | 4878 | 6464 | 5981 | 6627 | 6464 | 6289 |
| 56 day | 4819 | 6878 | 5465 | 7046 | 7514 | 7034 | 7409 | 6292 |
| PSI Per LB-28 | 7.50 | 11.12 | 8.41 | 11.14 | 10.31 | 11.43 | 11.14 | 10.84 |
| PSI Per LB-56 | 8.309 | 11.86 | 9.422 | 12.15 | 12.96 | 12.13 | 12.77 | 10.85 |
| Set Times | N/A | N/A | 385 m | 363 m | 315 m | 310 m | 305 m | 284 m |

As can be seen from a comparison of even examples (no carbon encapsulating agent) to odd examples (2 oz of F-500 encapsulating agent), small quantities of encapsulating agent can allow for a substantial reduction in the amount of air entraining agent needed to achieve at least 6% air in concrete. This is a surprising and unexpected result.

Data also shows that the voids created by the air entrainment in the presence of the encapsulating agent are the same or superior to air entrainment without the carbon encapsulating agent, thereby suggesting the void spaces will produce durable concrete. In one embodiment, the specific surface area of voids in concrete manufactured according to the invention was 565 and the spacing factor was 0.006 as calculated using ASTM standards known in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A concrete mixture, comprising:
   (i) a hydraulic cement;
   (ii) a supplementary cementitious material including at least 1.0 wt % carbon;
   (iii) water;
   (iv) an air entraining agent in a concentration of at least 0.2 oz/100 wt % of cementitious material; and
   (iv) a carbon encapsulating agent including a non-foaming surfactant including a nitrilotrisethanol aliphatic soap in sufficient concentration to sequester a majority of the carbon in the supplementary cementitious material.

2. A method as in claim 1, wherein the surfactant is non-foaming and insoluble in air bubbles formed by the air entraining agent and water in the wet concrete mix.

3. A concrete mixture as in claim 1, wherein the carbon encapsulating agent includes nitrilotrisethanol aliphatic soap, alkyl ether amine reacted with one or more aliphatic acids and/or a linear aliphatic alcohol.

4. A concrete mixture as in claim 3, wherein the alkyl ether amine reacted with one or more aliphatic acids is Poly(oxy-1,2-ethanediyl) (iminodi-2,1-ethanediyl) bishydroxy fatty alkyl ether reaction products with one or more aliphatic acids.

5. A concrete mixture as in claim 3, wherein the concentration of the alkyl ether amine reacted with one or more aliphatic acids is 25%-55% by weight of the carbon encapsulating agent.

6. A concrete mixture as in claim 3, wherein the linear aliphatic alcohol has a concentration in a range from 3-10% of the encapsulating agent.

7. A concrete mixture as in claim 1, wherein the surfactant is a nitrilotrisethanol aliphatic soap.

8. A concrete mixture as in claim 7, wherein the concentration of nitrilotrisethanol aliphatic soap is 1-4.5% by weight of the carbon encapsulating agent.

9. A concrete mixture as in claim 1, wherein the surfactant is non-foaming and has a weight greater than 500.

10. A concrete mixture as in claim 1, wherein the carbon encapsulating agent is included in the composition in a range from 0.5-10.0 oz/100 wt % of supplementry cementitious material.

11. A concrete composition as in claim 1 wherein the air content is at least 5%.

12. A concrete composition as in claim 1, wherein the supplementry cementitious material is a fly ash.

13. A cured concrete formed by allowing the concrete composition of claim 1 to harden.

14. A method for making an air entrained concrete, comprising:
   providing a supplementary cementitious material comprising at least 1 wt % carbon; and
   mixing together a hydraulic cement and the supplementary cementitious material with aggregate, water, an air entraining agent, and a carbon encapsulating agent to form a wet cementitious concrete, wherein the carbon encapsulating agent includes a non-foaming surfactant including a nitrilotrisethanol aliphatic soap and wherein the encapsulating agent is included in sufficient quantity to sequester at least a majority of the carbon.

15. A method as in claim 14, wherein the supplementry cementitious material includes at least 4 wt % carbon and the carbon encapsulating agent is included in a concentration sufficient to sequester at least 98% of the carbon.

16. A method as in claim 14, wherein the carbon encapsulating agent includes nitrilotrisethanol aliphatic soap, alkyl ether amine reacted with one or more aliphatic acids and/or a linear aliphatic alcohol.

17. A method as in claim 14, wherein the active agent in the surfactant is insoluble in air bubbles formed by the air entraining agent and water in the wet concrete mix.

18. A method as in claim 14, wherein the surfactant is a nitrilotrisethanol aliphatic soap.

19. A method as in claim 14, wherein the surfactant is non-foaming and has a molecular weight greater than 500.

20. A method as in claim 14, wherein the carbon encapsulating agent is included in the composition in a range from 0.5-10.0 oz/100 wt % of supplementry cementitious material.

21. A concrete mixture as in claim 1, wherein the supplementry cementitious material includes at least 4 wt % carbon and the carbon encapsulating agent is included in a concentration sufficient to encapsulate at least 98% of the carbon.

* * * * *